(12) United States Patent
Noami et al.

(10) Patent No.: US 11,590,657 B2
(45) Date of Patent: Feb. 28, 2023

(54) IMAGE PROCESSING DEVICE, CONTROL METHOD THEREOF, AND PROGRAM STORAGE MEDIUM

(71) Applicant: CANON KABUSHIKI KAISHA, Tokyo (JP)

(72) Inventors: Shunsuke Noami, Yokohama (JP); Genki Cho, Kawasaki (JP); Hiroto Oka, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 436 days.

(21) Appl. No.: 16/685,173

(22) Filed: Nov. 15, 2019

(65) Prior Publication Data

US 2020/0164520 A1 May 28, 2020

(30) Foreign Application Priority Data

Nov. 26, 2018 (JP) .............................. JP2018-220482

(51) Int. Cl.
  *B25J 9/16* (2006.01)
  *G06T 7/73* (2017.01)
  (Continued)

(52) U.S. Cl.
  CPC .......... *B25J 9/1697* (2013.01); *B25J 9/1664* (2013.01); *B25J 19/023* (2013.01); *G06T 7/73* (2017.01); *H04N 5/232* (2013.01)

(58) Field of Classification Search
  CPC ...... B25J 9/1697; B25J 9/1664; B25J 19/023; B25J 9/1671; B25J 9/1602; B25J 9/1692;
  (Continued)

(56) References Cited

U.S. PATENT DOCUMENTS 9,089,971 B2   7/2015   Aoba
9,996,762 B2   6/2018   Cho et al.
(Continued)

FOREIGN PATENT DOCUMENTS

CN   103914855 A   7/2014
CN   107891414 A   4/2018
(Continued)

OTHER PUBLICATIONS

The above patent documents were cited in a Feb. 11, 2022 Chinese Office Action, a copy of which is enclosed with an English Translation, that issued in Chinese Patent Application No. 201911175749.9.

(Continued)

*Primary Examiner* — Robert T Nguyen
(74) *Attorney, Agent, or Firm* — Cowan, Liebowitz & Latman, P.C.

(57) ABSTRACT

The image processing device according to the invention includes: a first acquisition unit to acquire a captured image; a display control unit to display a setting screen to allow to user to set an image processing area, which is an area where predetermine image processing is performed, in the image acquired by the first acquisition unit on a display device; and a second acquisition unit configured to acquire movable range information indicating a movable range of a working device, operations of which are controlled on the basis of a result of the predetermined image processing. The display control unit controls the display of the setting screen so as to cause the user to identify a range in which the working device is not able to operate in the image, on the basis of the movable range information acquired by the second acquisition unit.

16 Claims, 9 Drawing Sheets

(51) Int. Cl.
*H04N 5/232* (2006.01)
*B25J 19/02* (2006.01)

(58) Field of Classification Search
CPC ............... B25J 9/1666; G06T 7/73; G06T 2207/10016; G06T 2207/30164; H04N 5/232; H04N 5/23206; H04N 5/232933; H04N 5/232935; H04N 7/183; G05B 2219/37067; G05B 2219/39057
See application file for complete search history.

(56) References Cited

U.S. PATENT DOCUMENTS

| | | | |
|---|---|---|---|
| 10,137,574 B2 | 11/2018 | Uchiyama | |
| 10,500,731 B2 | 12/2019 | Yoshida et al. | |
| 10,882,189 B2 * | 1/2021 | Matsuura | B25J 9/1671 |
| 2014/0015957 A1 * | 1/2014 | Fujikawa | G01B 11/27 |
| | | | 348/95 |
| 2016/0075025 A1 * | 3/2016 | Maeda | B25J 9/1671 |
| | | | 901/49 |
| 2017/0142340 A1 * | 5/2017 | Kishi | G06T 1/0014 |
| 2020/0007751 A1 * | 1/2020 | Itoh | H04N 5/23293 |

FOREIGN PATENT DOCUMENTS

| | | |
|---|---|---|
| JP | 60-195613 A | 10/1985 |
| JP | 61-13309 A | 1/1986 |
| JP | 2012-218119 A | 11/2012 |
| JP | 2016-001768 A | 1/2016 |
| JP | 2016-120567 A | 7/2016 |
| JP | 2018008347 A | 1/2018 |

OTHER PUBLICATIONS

The above documents were cited in a Jun. 28, 2021 Chinese Office Action, a copy of which is enclosed with an English Translation, that issued in Chinese Patent Application No. 201911175749.9.
The above foreign patent documents were cited in the Oct. 4, 2022 Japanese Office Action, a copy of which is enclosed without an English Translation, that issued in Japanese Patent Application No. 2018-220482.

* cited by examiner

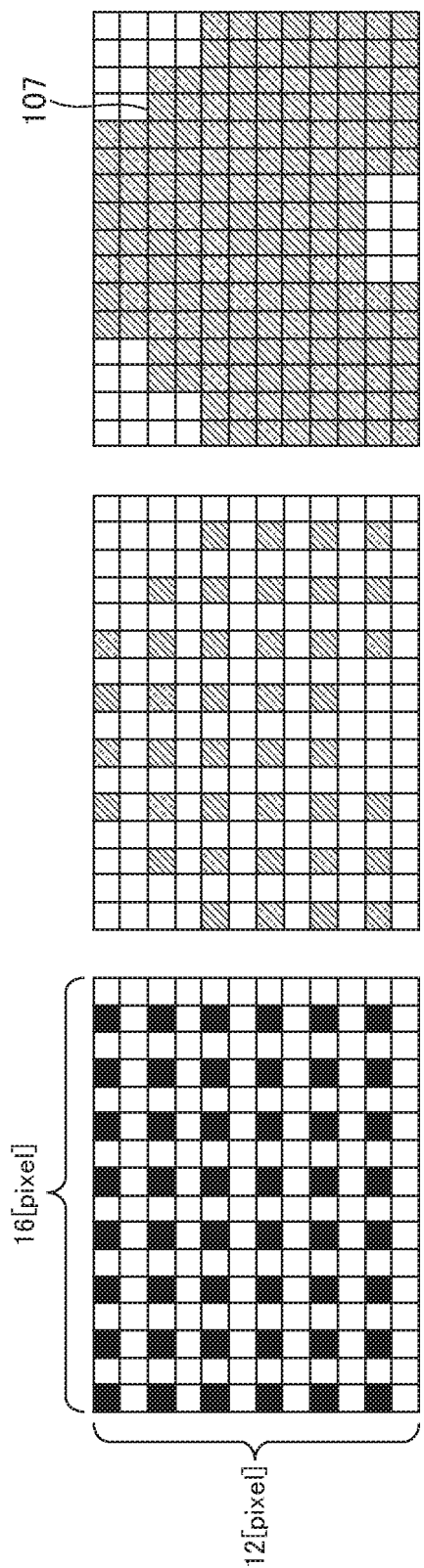

IMAGE PROCESSING DEVICE, CONTROL METHOD THEREOF, AND PROGRAM STORAGE MEDIUM

BACKGROUND OF THE INVENTION

Field of the Invention

The present invention relates to a technology for supporting image processing settings for an image processing device that operates in conjunction with a working device such as a robot.

Description of the Related Art

A system that performs production, quality checking, transport, and the like of products using an imaging device and a robot device is known. In such a system, a gripping mechanism, a robot arm, an actuator, a transport mechanism, and the like are controlled for handling objects (hereinafter, called "works"). For example, the system can perform a variety of operations by making the imaging device images works, performing image processing for measuring a position and inspecting the works, and changing a control instruction for the robot device or correcting operations of the robot device on the basis of results of the measurement and the inspection.

An image processing device that operates in conjunction with a robot device is also referred to as robot vision, and is used for the purpose of detecting presence or absence of work by using a captured image and measuring a position, a posture, and the like of the work in many cases. For industrial purposes, for example, pattern matching, edge detection, and the like are performed as image processing for correcting operations of a robot. In such image processing, only a part of an area in the image may be designated as a target of image processing (hereinafter, called "an image processing area") in order to shorten a processing time. Data regarding the position, the posture, and the like of the work calculated in the image processing is converted from data in a camera coordinate system into data in a robot coordinate system and is used for controlling operations, such as picking-up operation, of the robot.

Japanese Patent Application Publication No. 2016-120567 discloses a method for converting a coordinate system of data from a camera coordinate system into a robot coordinate system by an image processing device controlling a robot and an imaging device. According to such a method, it is possible to convert data regarding a position and a posture of a work detected in a captured image into data in a robot coordinate system without a user creating a complicated robot operation control program.

Incidentally, it is not always possible to execute a next robot operation (such as gripping of the work) after conversion of the data indicating the position of the work measured in the image processing into data in a robot coordinate system since a movable range of the robot is limited. Even if the imaging device can image the work, recognize the work in the image, and measure the position and the posture thereof, for example, the robot cannot move to the position in a case in which the position and the posture of the work is outside the movable range of the robot.

SUMMARY OF THE INVENTION

The invention provides an image processing device that operates in conjunction with a working device, and can support setting of an image processing area and thus efficiently perform setting processing.

According to an embodiment of the invention, there is provided an image processing device including: a first acquisition to acquire a captured image; a display control unit to display a setting screen to allow a user to set an image processing area, which is an area where predetermined image processing is performed, in the image acquired by the first acquisition unit on a display device; a working device, operations of which are controlled on the basis of a result of the predetermined image processing; and a second acquisition unit to acquire movable range information indicating a movable range of the working device, in which the display control unit controls the display of the setting screen so as to cause the user to identify a range in which the working device is not able to operate in the image, on the basis of the movable range information acquired by the second acquisition unit.

According to the image processing device of the invention, it is possible to support setting of an image processing area in operations in conjunction with a working device and thereby to efficiently perform the setting processing.

Further features of the present invention will become apparent from the following description of exemplary embodiments with reference to the attached drawings.

BRIEF DESCRIPTION OF THE DRAWINGS

FIGS. 8A to 8C are diagrams for explaining a method for sampling pixels and a method for acquiring a movable range of the robot according to the embodiment.

DESCRIPTION OF THE EMBODIMENTS

Hereinafter, a preferred embodiment of the invention will be described in detail with reference to drawings. Although the embodiment illustrates an example of a system that controls a robot and causes the robot to perform operations, the embodiment can be applied to various systems provided with working devices such as a manipulator, a transport device, and the like.

Figure 1:
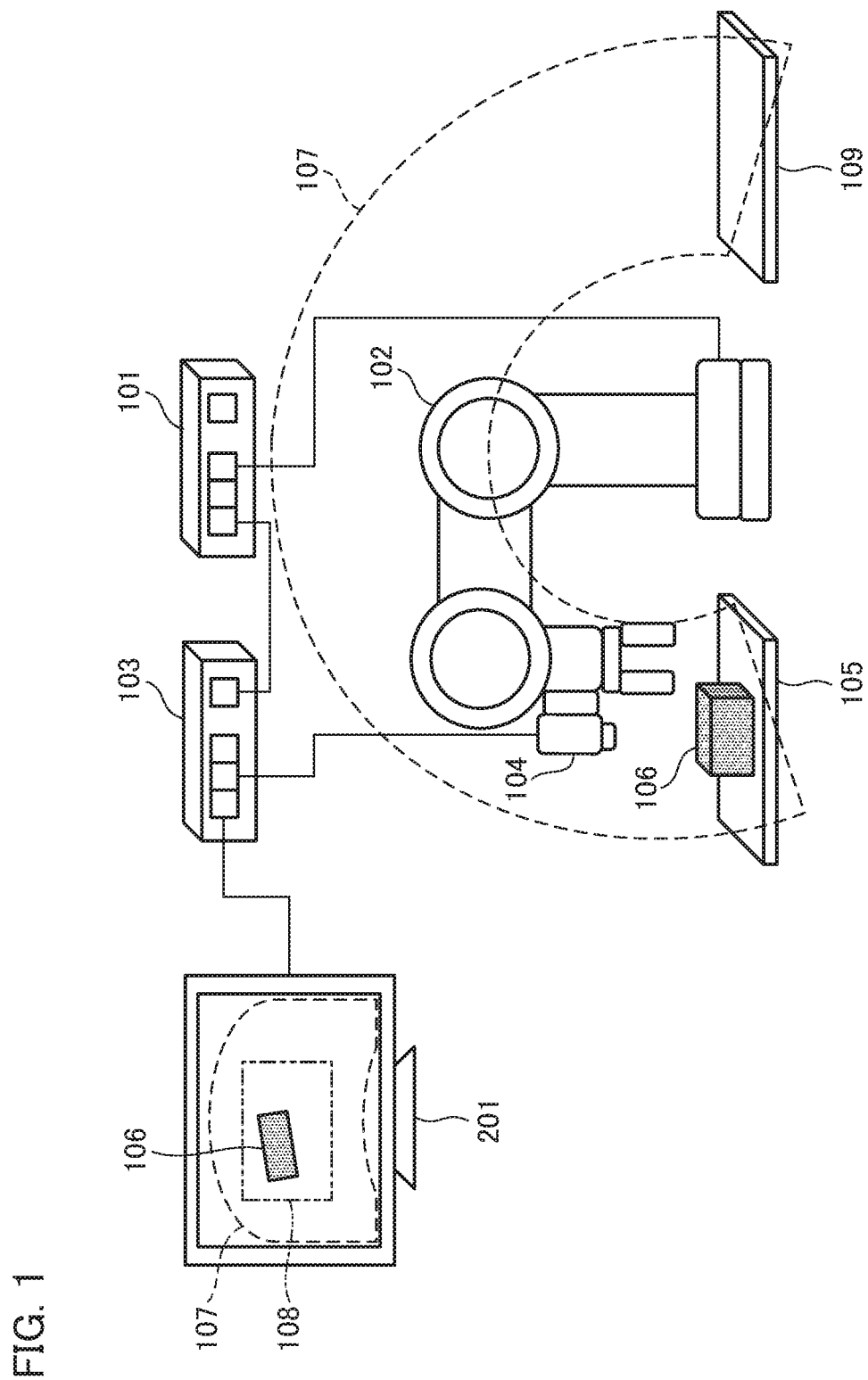
FIG. 1 is an overall configuration diagram of a system including an image processing device according to an embodiment.

FIG. 1 is an overall configuration diagram of a system including an image processing device. A robot control device 101 controls the respective shafts of a robot and tools attached to the robot in response to control instructions from an external device. In the embodiment, a robot 102 includes a so-called arm portion and a tool portion that is attached to a tip end of the arm. As for the tool portion, a hand for gripping a work will be described as an example. Further, although the robot control device 101 according to the embodiment is assumed to receive control instructions from an image processing device 103, possible system configurations and instruction forms are not limited thereto. Also, although the robot control device 101 and the image processing device 103 may be accommodated in a case body that is the same as that for the robot 102 in sonic cases, the embodiment will be described on the assumption that the robot control device 101 and the image processing device 103 are separate devices.

The image processing device 103 controls imaging operations performed by the imaging device 104 on the basis of setting of predetermined imaging parameters performs processing on the captured image, and outputs a result of the processing in accordance with an arbitrary procedure. Although the imaging device 104 is illustrated in such a form in which the imaging device 104 is attached to the robot 102, the imaging device 104 may be mounted in a separate manner.

Operations of the system are started by the image processing device 103 sending a control instruction to the robot control device 101. If the control instruction is received, the robot control device 101 controls the robot 102 such that the robot 102 is caused to change its posture such that it is possible to image a work 106 on a working platform 105 (hereinafter, referred to as an imaging posture). If the posture of the robot 102 is changed to the imaging posture, then the image processing device 103 images the work 106 using the imaging device 104. Next, the image processing device 103 performs image processing using data of the captured image and measures the position and the posture of the work 106. At this time, the image processing device 103 may distinguish a type of work 106 and perform inspection regarding whether or not there are any problems in quality of the work 106 as needed. If the processing is completed, the image processing device 103 converts data of the measured position and posture from data in a camera coordinate system into data in a robot coordinate system and transmits the data to the robot control device 101.

If the data is received from the image processing device 103, the robot control device 101 generates trajectory data of operations in a movable range 107 of the robot 102 (within the frame of the dotted line) and causes the robot 102 to operate on the basis of the trajectory data. Further, the robot control device 101 performs control for gripping the work 106 with a hand (end effector) of the robot 102. Subsequently, the robot control device 101 causes the robot 102 to move to a designated position on a placement platform 109 and performs control for releasing the gripping of the work with the hand, thereby causing the work 106 to have moved. In addition to this, there may be a case of continuing with an operation of assembling the work gripped with the hand to another work.

In a case in which the imaging device 104 is attached to the robot 102 as illustrated in FIG. 1, the robot 102 is changed to the imaging posture, imaging parameters of the imaging device 104 are adjusted, and imaging is then performed. The user teaches the robot 102 a position above the working platform 105 as a teaching point for imaging in advance, and the teaching point is used thereafter to repeatedly perform imaging and image processing.

The teaching point and imaging parameters corresponding thereto are stored in the image processing device 103, and the imaging parameters are used to perform the following imaging. Instead of the imaging parameters, the image processing device 103 may store a method for deciding the imaging parameters (utilization of fixed values, automatic exposure, automatic focal point adjustment, and the like). Data regarding the teaching point is stored in the robot 102, the robot control device 101, the image processing device 103, or the like. Also, imaging parameters for image processing are stored in the image processing device 103.

Figure 2:
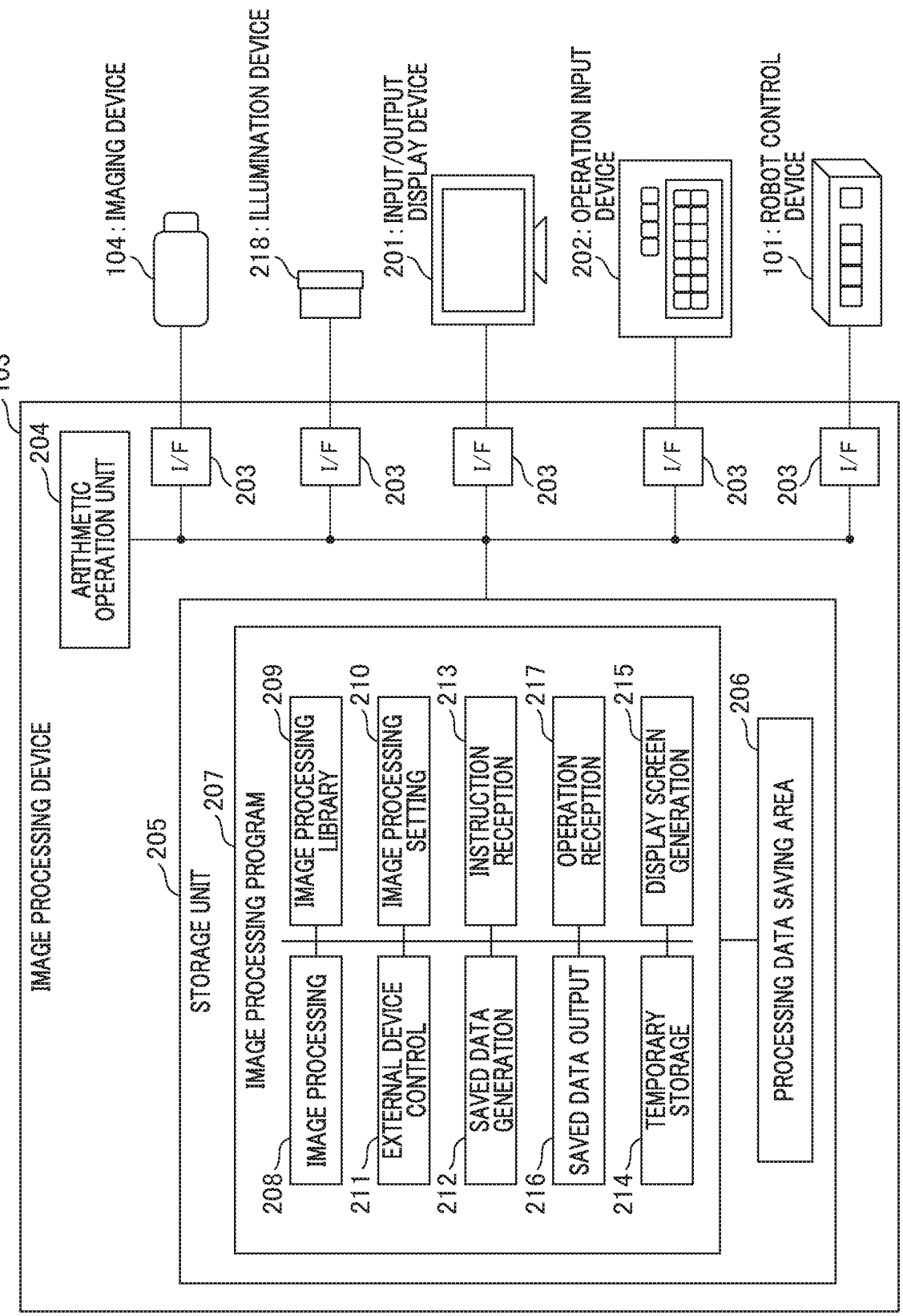
FIG. 2 is a block diagram mainly illustrating the image processing device according to the embodiment.

FIG. 2 is a block diagram mainly illustrating the image processing device 103. The image processing device 103 is connected to the robot control device 101 and the imaging device 104 via a plurality of interface units 203. An input/output display device 201 and an operation input device 202 are user interface devices connected to the image processing device 103 via the interface units 203. The respective devices are connected to each other via the respective interface units 203 disposed on an internal bus of the image processing device 103. The respective interface units 203 include a network interface unit, a serial communication interface unit, and the like for performing communication based on communication standards suitable for connection targets.

The input/output display device 201 includes a display device for displaying an image, such as a cathode-ray tube (CRT) or a liquid crystal panel. The operation input device 202 includes a keyboard, a pointing device, a touch panel, an input operation controller, a gesture input device, or the like.

The image processing device 103 may be provided with an illumination device 218 for the imaging by the imaging device 104 as needed. The illumination device 218 includes a light source such as a halogen lamp or a light emitting diode and is connected to the image processing device 103 via the interface units 203. Also, an external storage device, which is not illustrated in the drawings, may be connected to the image processing device 103 to extend the storage capacity.

The robot control device 101 is connected to the image processing device 103 via a network, a cable, or the like. The robot control device 101 generates trajectory data of operations of the robot 102 and has information regarding the movable range 107 of the robot 102.

The image processing device 103 has an arithmetic operation unit 204 that includes a central processing unit (CPU) that serves as a subject of control for image processing, an image processing processor, or the like. As the CPU, a general-purpose microprocessor can be used. The arithmetic operation unit 204 is connected to the storage unit 205 via an internal bus (a data bus, an address bus, another control line, or the like).

The storage unit 205 can include, for example, a ROM, a RAM, or a file area or a virtual storage area of an external storage device. ROM is an abbreviation of "read only memory", and RAM is an abbreviation of "random access memory". The storage unit 205 has a processing data saving area 206 and a program storage area. The processing data saving area 206 includes a RAM area in the storage unit 205 or a file area or a virtual storage area or the like in an external storage device. The processing data saving area 206 is used as a storage area for storing the setting parameters and the like for image processing as well as temporary storage for processing data.

The program storage area of the storage unit 205 stores an image processing program 207 for executing image processing according to the embodiment. The image processing program 207 is a program for changing settings for image processing and executing predetermined image processing in response to various operations performed through the operation input device 202. Also, data regarding details of changes can be saved in and deleted from the processing data saving area 206.

The image processing program 207 includes software modules that realize various functions. For example, an image processing module 208 is a main body part of the program that realizes image processing. For image processing performed by the image processing module 208, an image processing library 209 is used. The image processing library 209 is implemented in the storage unit 205 as a library that is linked in a stationary or dynamic manner, for example. An image processing selling module 210 decides a behavior of the image processing program 207. Image processing setting is performed in response to various operations performed through the operation input device 202.

Further, the image processing program 207 includes an input/output (I/O) sub-routine for realizing the following functions. The image processing program 207 includes, for example, an external device control sub-routine 211, a saved data generation sub-routine 212, and an instruction receiving sub-routine 213 for receiving control instructions from the robot control device 101. Also, the image processing program 207 includes a temporary storage sub-routine 214 that uses a RAM area, a cache area of the arithmetic operation unit 204, and the like, and a display screen generation sub-routine 215. A saved data output sub-routine 216 is a program for reading and outputting data saved in the processing data saving area 206. An operation receiving sub-routine 217 is a program for receiving operation instructions from the operation input device 202. The respective functions are mounted in the storage unit 205 in the form of application (utility) programs or sub-routines formed as libraries that is linked in a stationary or dynamic manner.

The CPU provided in the arithmetic operation unit 204 of the image processing device 103 performs control of the imaging device 104 and image processing by executing the image processing program 207. The operation input device 202 executes processing for receiving a user's operation instructions on the basis of control of the operation receiving sub-routine 217 and processing for receiving control instructions from the robot control device 101 on e basis of control of the instruction receiving sub-routine 213. The arithmetic operation unit 204 calls the respective function modules or libraries of the image processing program 207 in response to operation instructions or control instructions, performs arithmetic operations, and transmits data regarding a result of image processing to the robot control device 101. Also, the arithmetic operation unit 204 can transmit the data regarding the result of image processing to an external storage device and perform logging. Further, the image processing program 207 performs processing of synthesizing a screen configuration stored in advance the result of the image processing on the screen and displaying the synthesized result on the input/output display device 201.

Figure 3:
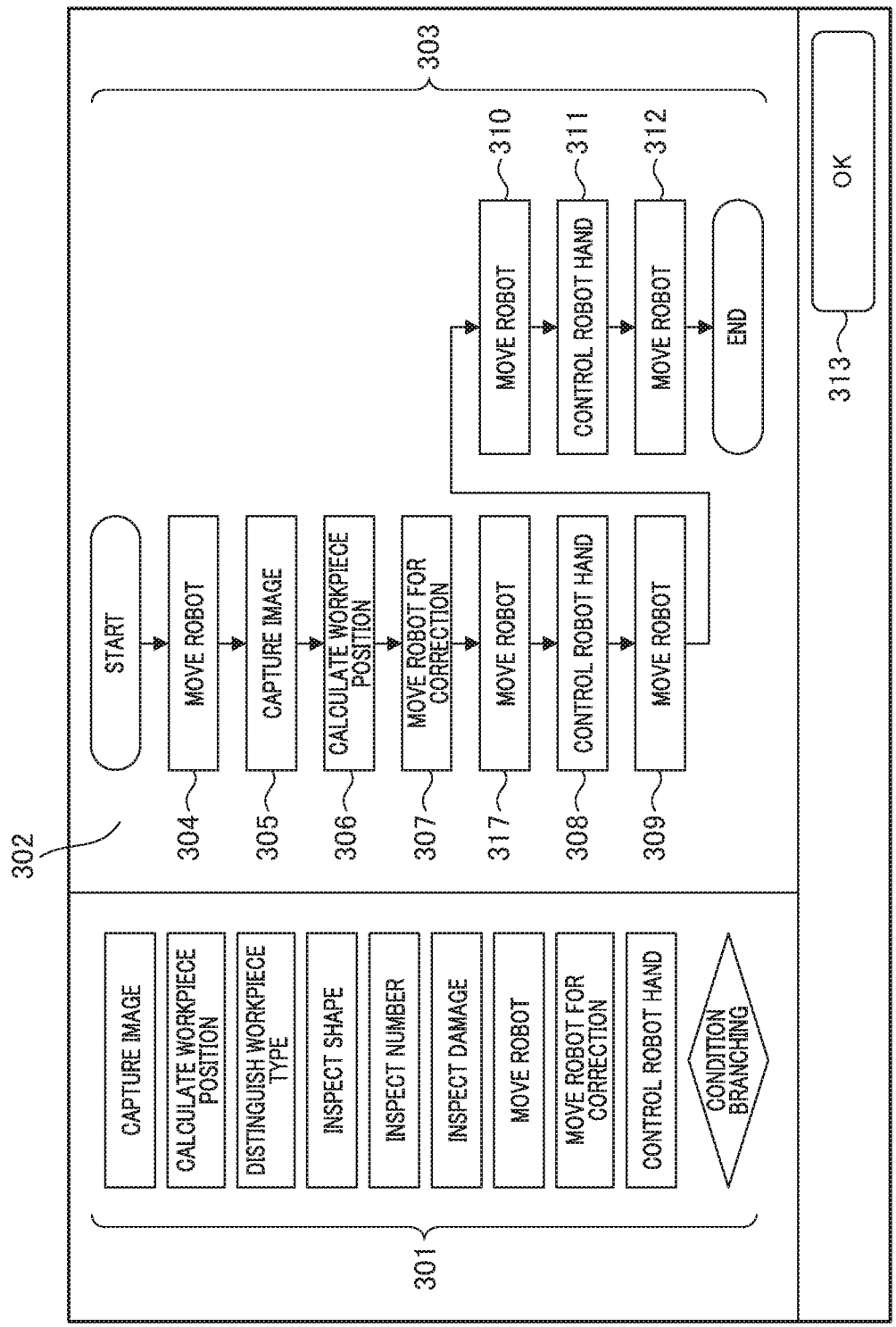
FIG. 3 is a diagram illustrating an example of a flowchart creation screen according to the embodiment.

FIG. 3 is a diagram illustrating an example of a flowchart creation screen for creating the image processing program 207. The screen is displayed on the input/output display device 201. The image processing program 207 according to the embodiment is assumed to be executed in accordance with a flowchart created by the user using the image processing device 103.

As another embodiment, there is an embodiment in which the user creates the image processing program 207 using an image processing program creation device, which is not illustrated in FIG. 1. In this case, the created image processing program 207 is transferred to the storage unit 205 of the image processing device 103 and is stored therein.

Also, an embodiment in which combinations of template image processing flowcharts are prepared in advance for the respective functions or purposes and the image processing program 207 is created by selecting and packaging appropriate image processing flowcharts may also be employed. In this case, the user can select desired functions on a graphical user interface (GUI) and adjust parameters and the like.

A part list 301 is a list of the respective processing parts included in flowcharts. The user can designate various kinds of processing represented by rectangular frames and condition branching processing represented by rhomboidal frames. For example, the user may designate desired processing parts from the part list 301 using the operation input device 202. Then, the user arranges the designated processing parts in a flowchart area 302 by performing dragging and dropping operations with a pointing device or the like and then completes a flowchart by connecting the plurality of arranged processing parts with lines.

The flowchart 303 is an example in which processing of causing the robot 102 to pick up the work 106 from the working platform 105 and to place the work 106 on the placement platform 109 is described using a plurality of processing parts. According to the flowchart 303, posture control for causing the robot 102 to move to above the working platform 105 is performed as MOVE ROBOT 304 after starting the processing. CAPTURE IMAGE 305 is processing for imaging the work 106. The following processing part, CALCULATE WORK POSITION 306 is calculation processing for calculating the position and the phase of the work 106. MOVE ROBOT FOR CORRECTION 307 is processing for causing the hand of the robot 102 to move or rotate above the position of the work as correction control of the robot 102 in accordance with the position and the phase of the work 106 calculated in CALCULATE WORK POSITION 306.

The following processing part, MOVE ROBOT 307, is processing for causing the robot 102 to move to a position at which the work 106 can be gripped and picked up with the hand of the robot 102, for example, a position immediately above the work 106. CONTROL ROBOT HAND 308 is processing for picking up the work 106 by controlling opening and closing of the hand.

The following processing part, MOVE ROBOT 309, is processing for moving the robot to above the placement platform 109. MOVE ROBOT 310 is processing for lowering the hand of the robot 102 toward the placement platform 109. Here, MOVE ROBOT 309 and 310 may be collectively performed as one processing part. The processing part in that case is a robot moving part for causing the hand to move to the placement platform 109 via the position above the placement platform 109.

In CONTROL ROBOT HAND 311, processing of placing the work 106 by controlling opening and closing the hand is executed. The next step MOVE ROBOT 312 is processing for causing the robot 102 to move to an initial position. By ending CONTROL ROBOT HAND 311, the series of processing illustrated in the flowchart is ended.

In FIG. 3, the words displayed in the frames of the processing parts 304 to 312 and 317 are not necessarily the same as words in the part list 301 of the flowchart. For example, the processing part 309 may be displayed as "MOVE TO ABOVE PLACEMENT PLATFORM" while the processing part 310 may be displayed as "MOVE TO PLACEMENT PLATFORM". If the user double clicks any of the processing parts shown in the flowchart 303, then, the processing proceeds to processing for displaying a setting screen (hereinafter, referred to as a detailed setting screen) for sating detailed processing of the processing part. The user can adjust image processing parameters and an image processing area with reference to the detailed setting screen. Also, if the user performs a clicking operation on an OK button 313, the image processing device 103 creates the image processing program 207 for executing the processing described in the flowchart 303 and saves the image processing program 207 in the storage unit 205.

When the flowchart is created, it is necessary for the robot 102 to move to various positions corresponding to the position and the posture of the work 106 and thereby to check whether or not such operations can be executed. However, the image processing area set in the image processing does not always conform to the movable range of the robot 102. Therefore, setting for accommodating the image processing area in the movable range of the robot 102 is required. A setting support function for setting such an image processing area will be described in detail with reference to FIGS. 4 to 9.

Figure 4:
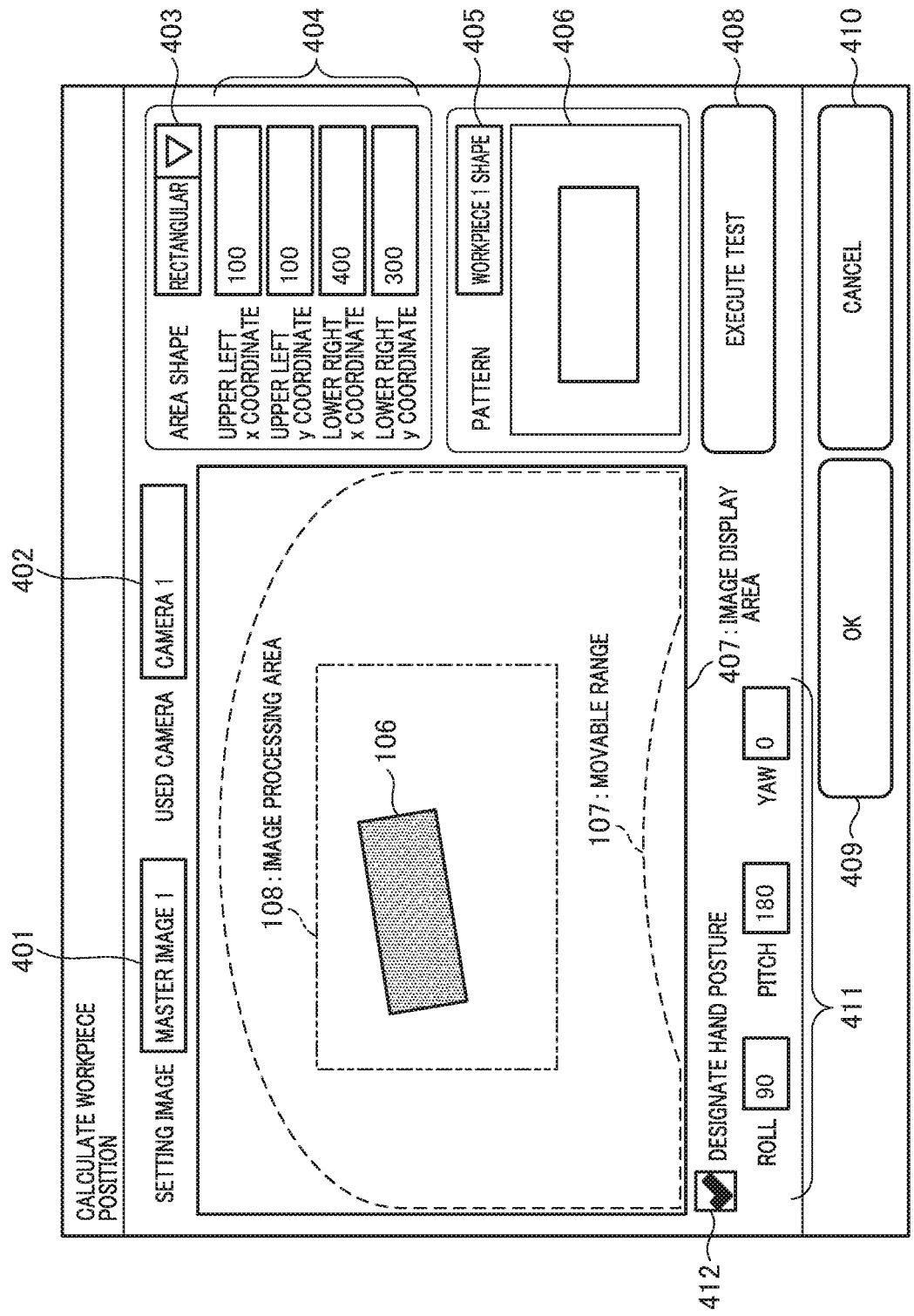
FIG. 4 is a diagram illustrating an example of a screen for supporting setting of an image processing area according to the embodiment.

FIG. 4 illustrates an example of a detailed setting screen in a case in which a processing part is CALCULATE WORK POSITION 306 in FIG. 3. The detailed setting screen is used as a user interface for supporting setting of the image processing area. An example in which the position and the posture of the work are recognized by an image processing method using pattern matching in CALCULATE WORK 306 POSITION will be described.

A selection unit 401 in FIG. 4 is used when the user registers a setting image. If the user operates the selection unit 401, file names of images saved in advance in the storage unit 205 of the image processing device 103 and a character string "camera image" are displayed as options in a list form. If the user selects a desired image from the list, the selected image is registered as a setting image. Also, in a case in which the user selects "camera image", imaging is performed with a camera (a camera 1 in FIG. 4) registered in an engaged camera 402.

The image display area 407 is a display area for supporting setting. If a captured image as a setting image is registered, the setting image is displayed in the image display area 407. At this time, the image processing device 103 performs processing of acquiring data regarding the movable range 107 of the robot and displaying the data with the setting image in a superimposed manner. A method for acquiring the movable range 107 of the robot will be described later with reference to FIGS. 5 to 8. Although the movable range 107 of the robot is displayed with a broken line in the example in FIG. 4, the display method is not limited, and for example, the inside or outside of the area may be displayed in a transparent manner or with colors or in a blinking manner.

A checkbox 412 below the image display area 407 is a checkbox for setting whether or not to designate a hand posture when the movable range 107 of the robot is acquired (if the checkbox is checked, this means a hand posture is to be "designated"). In a case in which an operation such as gripping of the work 106 cannot be performed unless the robot 102 is in a specific hand posture, the user changes the checkbox 412 to a checked state. In this manner, it is possible to set a roll angle, a pitch angle, and a yaw angle in the hand posture through the setting input unit 411. Hereinafter, these angles will be specifically described with reference to FIG. 9.

First, the robot coordinate system is assumed to be an XYZ coordinate system. X, Y, Z represent the respective coordinate axes in a three-dimensional orthogonal coordinate system. Further, rotation coordinates represented by a roll angle, a pitch angle, and a yaw angle are added to the robot coordinate system as a reference. A tool coordinate system obtained by moving these coordinate axes in parallel such that the center of an attachment surface of the hand of the robot 102 corresponds to an origin is defined as an X'Y'Z' coordinate system. The roll angle, the pitch angle, and the yaw angle are shown as $\phi$, $\theta$, and $\Psi$, respectively.

Figure 9C:
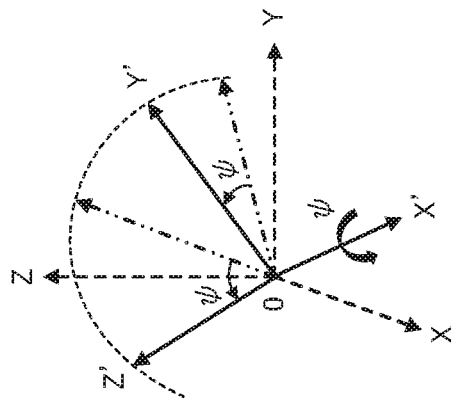
FIGS. 9A to 9C are diagrams illustrating rotation processing using a roll angle, a pitch angle, and a yaw angle according to the embodiment.
Figure 9B:
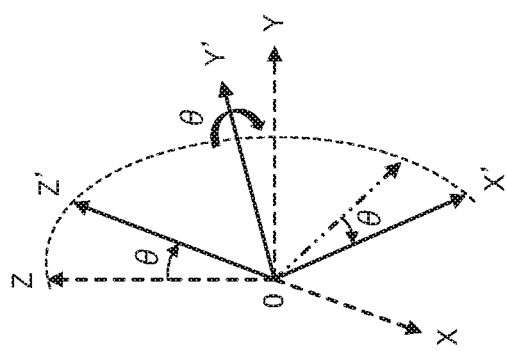
Figure 9A:
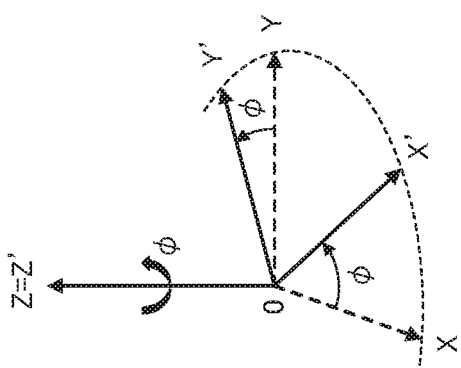

FIG. 9A illustrates rotation by the roll angle $\phi$, FIG. 9B illustrates rotation by the pitch angle $\theta$, and FIG. 9C illustrates rotation by the yaw angle $\Psi$. The rotation is executed in this order. At this time, the position and the posture of the hand are assumed to be fixed in the tool coordinate system. The hand posture may be expressed using Euler angles and the like.

As a method for designating the hand posture through the setting input unit 411, a method of directly inputting numerical values, a method of providing operation buttons for counting up and down and adjusting the hand posture by the user pressing the operation buttons, and the like may be exemplified.

The data regarding the movable range 107 of the robot is acquired using the values designated through the setting input unit 411 and is displayed in the image display area 407 in a superimposed manner. The data regarding the movable range 107 of the robot is updated every time setting items for the hand posture are changed. In a case in which a setting item for the hand posture is kept blank through the setting input unit 411, a current rotation angle is maintained in regard to the setting items.

Next, a user's processing for setting the image processing area 108 in the image display area 407 will be described.

An area shape 403 is a box with spin control, and the user performs a selecting operation with the area shape 403. For an area shape, shapes such as a rectangular shape, a circular shape, an oval shape, and an annular shape may be presented as options. Alternatively, an area shape may be set by combining these shapes, or a free shape created using a pointing device or the like may be set as the area shape. The example FIG. 4 illustrates a case in which a rectangular image processing area 108 has been set.

The setting input portion 404 receives inputs of an x coordinate and a y coordinate for the upper left side of the rectangle, and an x coordinate and a y coordinate for the lower right side thereof as setting items for the rectangular area. In the example in FIG. 4, an image coordinate system with an origin at the upper left of a captured image, with a horizontal direction as an x-axis direction, and with a vertical direction as a y-axis direction is used. As a method for designating the setting items for the rectangular area, a method of directly inputting numerical values, a method of providing operation buttons for counting up and down and adjusting the shape by the user pressing the operation buttons, and the like may be exemplified. The image processing area 108 is displayed in the image display area 407 in a superimposed manner, and the display is updated every time a result of selecting the area shape 403 or the setting values set through the setting input unit 404 are changed.

The user can set a desired image processing area 108 while checking the setting image displayed in the image display area 407 and the movable range 107 of the robot. That is, it is only necessary to designate the image processing area 108 such that the image processing area 108 is included in the movable range 107 of the robot.

Also, in a case in which the image processing area 108 is set so as not to be included in the movable range 107 of the robot through a user's operation, a predetermined notification may be displayed on the setting screen.

In addition, although the example in which the image processing area 108 is designated at an arbitrary position through a user's direct operation has been described above, another method may be employed. For example, a method of directly using the movable range 107 of the robot as the image processing area 108 and a method of limiting the image processing area 108 inside the movable range 107 of the robot may be exemplified. According to the latter method, a frame representing a boundary of the image processing area 108 is restricted to being inside the movable range 107, for example. According to these methods, it is possible to avoid the image processing area 108 projecting out of the movable range 107 of the robot due to a user's erroneous operation.

Next, a pattern matching setting procedure executed on the image processing area 108 will be described.

The selection unit 405 is used for setting a pattern for pattern matching. The pattern is generated on the basis of feature information such as an intensity gradient, a contrast density, and position and phase information of the work and is saved in advance in the storage unit 205 of the image processing device 103. If the user sets a desired pattern by operating the selection unit 405, a pattern for matching is displayed in the pattern display area 406. At this time, parameters such as a matching threshold may be provided as setting items.

An operation button 408 is a test execution button, and if the user presses the operation button 408, imaging is performed using a camera (the camera 1 in FIG. 4) selected by the engaged camera 402. Although the imaging device 104 may be selected in advance if only the imaging device 104 is a used camera, it is necessary to designate a camera to be used in a case in which a plurality of cameras are available.

Pattern matching processing is performed on the designated image processing area 108 in the image acquired by the imaging device 104, and the position, the posture, and the like of the work 106 are measured. Thereafter, if the user operates the OK button 409, data regarding the setting values for the image processing area 108, the setting values for the pattern matching, and the like that have already been set are associated with the image processing program 207 and the like ad saved in the storage unit 205 of the image processing device 103. The data is read and used when the program is executed and when the setting screen is displayed again. Meanwhile, if the user presses a cancel button 410, the data regarding the setting values for the image processing area 108, the setting values for the pattern matching, and the like that have been changed in the detailed setting screen in FIG. 4 are discarded without being saved.

Figure 5:
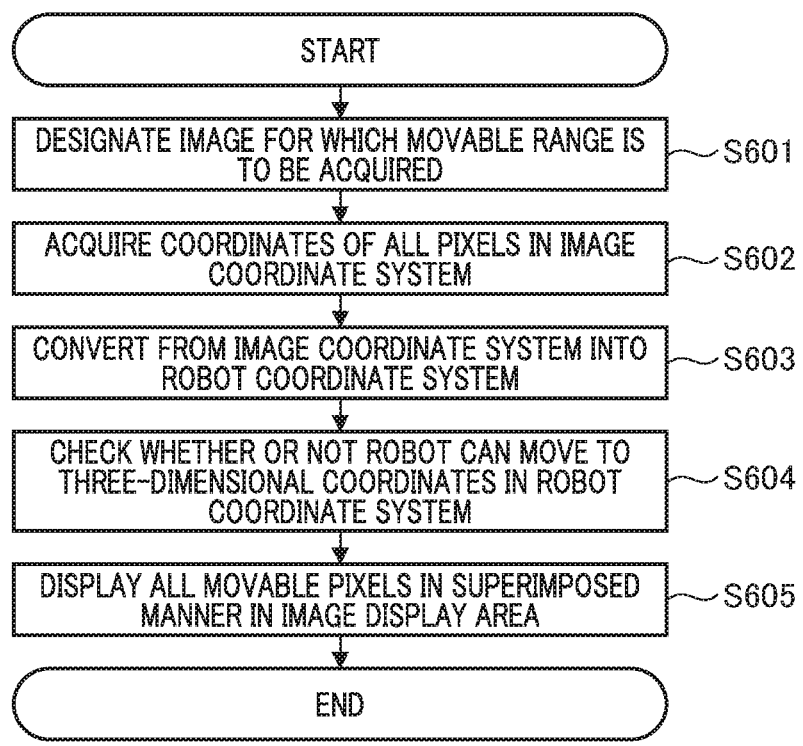
FIG. 5 is a flowchart of processing for acquiring a movable range of a robot according to the embodiment.

FIG. 5 is a flowchart for explaining processing of acquiring the movable range 107 of the robot, in the example in FIG. 5. it is assumed that the movable range 107 of the robot is acquired using all pixels in the captured image. The following processing is realized by the CPUs of the image processing device 103 and the robot control device 101 executing a program.

In S601, a setting image for acquiring the movable range 107 of the robot is designated. The setting image is an image displayed in the image display area 407 in FIG. 4.

In S602, processing of acquiring two-dimensional coordinate data in an image coordinate system is performed on all pixels in the setting image designated in S601.

In S603, the image processing device 103 performs processing of converting the image coordinate system into the robot coordinate system. From the two-dimensional coordinate data in the image coordinate system acquired in S602, data regarding a tool coordinate system, that is, the respective coordinate values on an X' axis, a Y' axis, and a Z' axis are calculated. For example, an imaging device that acquires two-dimensional captured image data is assumed. A correspondence between a number of the pixels in the captured image and an actual distance of the pixels in a measurement plane (on the working platform 105) and a correspondence between a measurement plane and an imaging position of the imaging device are defined in advance, and a processing of converting the image coordinate system into the tool coordinate system is performed. Alternatively, in a case of an imaging device capable of acquiring three-dimensional coordinate data along with color information or contrast density information, processing of converting into the tool coordinate system on the basis of a correspondence between the respective pixels in a three-dimensional captured image and three-dimensional coordinates is performed instead of coordinate conversion from plane information.

Further, three-dimensional coordinate conversion from the tool coordinate system into a robot coordinate system may be performed. In the conversion, a matrix arithmetic operation is performed using information regarding the position of the hand, the posture of the arm, and the like in the robot coordinate system.

In S604, processing of determining whether or not the robot 102 can move to the three-dimensional coordinate position in the robot coordinate system obtained in S603 is executed. The determination processing is executed using a moving check command or the like in the robot control device 101. The moving check command is a command used in a case in which the image processing device 103 inquires of the robot control device 101 whether or not the robot 102 can move to the designated coordinates.

In addition, in a case in which the robot control device 101 does not accommodate a moving check command, the image processing device 103 provides a moving instruction to the robot control device 101 using a moving command and checks whether or not the robot 102 can move to the designated three-dimensional coordinates. Thereafter, processing of stopping the moving of the robot 102 and returning the robot 102 to original position and posture is performed.

In addition, in a case of a system that can use a 3D model representing the movable range 107 of the robot, it is possible to read data regarding the 3D model in advance and determine whether or not the robot 102 can move to the coordinate positon designated in the robot coordinate system with reference to the read data. The data regarding the 3D model can be referred to by a model number or a model name of the robot 102 using the operation input device 202 of the image processing device 103. Although the data regarding the 3D model are saved in the storage unit of the robot control device 101 or the storage unit 205 of the image processing device 103, or the data may be referred to by retrieval from a storage or the like on a network.

Also, a function of inputting a movable range of each shaft of the robot 102 and generating a virtual 3D model may be provided.

In S605, the movable range 107 of the robot illustrated in FIG. 4 is displayed in the image display area 407. That is, the image of the movable range 107 of the robot is displayed in a superimposed manner on the image designated in S601 for all points (pixel positions) in the movable range 107 determined in S604.

Figure 6:
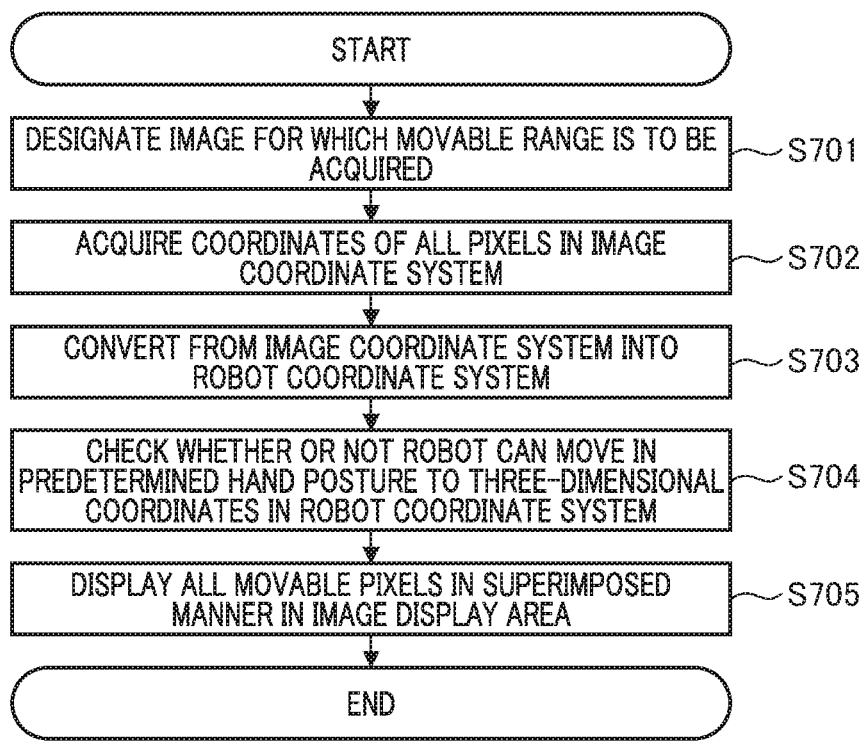
FIG. 6 is a flowchart of processing for acquiring a movable range of the robot in a specific posture according to the embodiment.

FIG. 6 is a flowchart for explaining processing of acquiring the movable range 107 of the robot on the basis of the input values through the setting input unit 411 illustrated in FIG. 4.

In a case in which the user places a check mark in the checkbox 412 in FIG. 4 and sets a roll angle, a pitch angle, and a yaw angle through the setting input unit 411, the following processing is executed.

In a case in which it is desired to cause the robot 102 to operate in a state in which the hand is at a desired position and in a desired posture using the setting values set through the setting input unit 411, the movable range 107 of the robot at that position and in that posture can be acquired.

Since the processing in S701 to S703 is processing similar to that in S601 to S603 in FIG. 5, description thereof will be omitted.

in S704, processing of determining whether or not the robot can move in the hand posture designated through the setting input unit 411 to the three-dimensional coordinate position in the robot coordinate system obtained in S703 is performed. In S705, all pixels corresponding to positions to which the robot can move are displayed in a superimposed manner in the image display area 407 on the basis of a result of the determination processing in S705, thereby presenting the movable range 107 of the robot to the user.

Figure 7:
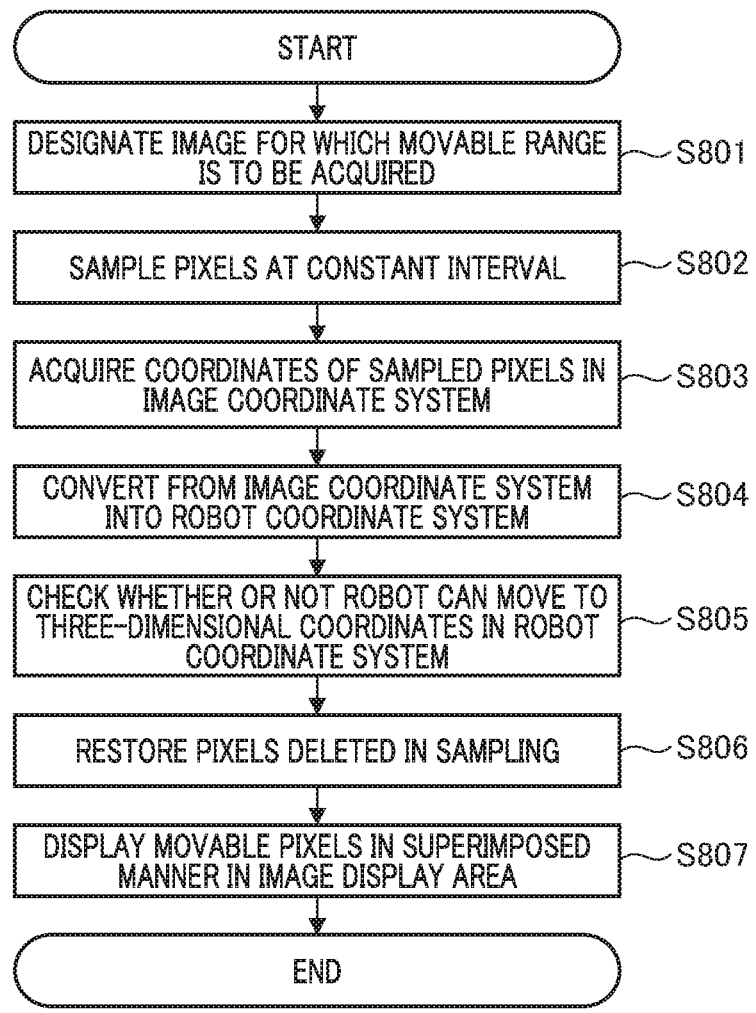
FIG. 7 is a flowchart of processing for acquiring a movable range of the robot on a basis of pixels sampled at a constant interval according to the embodiment.

Referring to FIGS. 7 and 8, a method of further efficiently acquiring data regarding the movable range 107 of the robot will be described.

FIG. 7 is a flowchart for explaining processing of efficiently acquiring the movable range 107 of the robot using pixels sampled at a constant interval from an image. Since the processing in S801 and S804 illustrated in FIG. 7 is processing similar to that in S601 and S603 in FIG. 5, detailed description thereof will be omitted, and only differences will be described.

FIGS. 8A to 8C are diagrams for explaining sampling of pixels and acquisition of the movable range of the robot.

In FIG. 7, processing similar to that in S601 described above is performed in S801.

Next, in S802, processing of sampling the pixels at a constant interval is performed on the image designated in S801. FIG. 8A is a schematic view illustrating an example in which every two pixels are sampled in a 12×16 [pixel] image as a target. The pixels represented with a black color represent sampled pixels (hereinafter, referred to as target pixels).

In S803, two-dimensional coordinate data in the image coordinate system is acquired from the target pixels acquired in S802.

In S804, processing similar to that in S603 described above is performed.

Next, in S805, whether or not the robot can move to a three-dimensional coordinate position in the robot coordinate system is determined similarly to S604 or S704. FIG. 8B is a schematic view illustrating pixels determined to be in the movable range 107 of the robot in S805 in a pixel group represented with the black color in FIG. 8A with hatching of oblique lines.

In FIG. 8B, the pixels that have not been sampled are located at the periphery of the pixel represented by the oblique lines. In S806, the pixels that have not been sampled are focused pixels. Then, whether or not peripheral pixels of the focused pixels are in the movable range 107 of the robot is determined. FIG. 8C is a schematic view illustrating a result of the determination. The peripheral pixels are determined to be in the movable range 107 if the focused pixels are in the movable range 107 of the robot, or the peripheral pixels are determined to be outside the movable range 107 if the focused pixels are outside the movable range 107 of the robot. As illustrated in FIG. 8C, a range including the peripheral pixels of the focused pixels is acquired as the movable range 107 of the robot.

In S807 in FIG. 7, processing of displaying the movable range 107 of the robot obtained in S806 in a superimposed manner in the image display area 407 is executed.

In this manner, a time for acquiring the data regarding the movable range 107 of the robot is shortened by reducing the number of target pixels through the sampling. If the sampling is applied to every two pixels as illustrated in FIG. 8, for example, the processing time can be reduced to about ¼ as compared with a case in which all the pixels are processed. Also, a method for interpolating the periphery of the focused pixels is not limited to the example in FIG. 8, and another method such as spline interpolation or local polynomial approximation may be performed.

Also, there is a method of efficiently acquiring the movable range 107 of the robot by searching for the boundary of the movable range 107 of the robot. According to the method, an image for acquiring the movable range 107 of the robot is designated first. The image processing device 103 executes processing of searching for pixels corresponding to the boundary of the movable range 107 of the robot from the left side to the right side on each row of the pixels included in the image. If pixels corresponding to the boundary are found, processing on the row thereof is ended. Pixels corresponding to the boundary of the movable range 107 of the robot are also searched from the right side to the left side of each row, from the upper side to the lower side of each column, and from the lower side to the upper side in a similar manner. The image processing device 103 calculates the movable range 107 of the robot by synthesizing a plurality of boundaries on the basis of the positions of the searched pixels. In addition to this, a method of acquiring the movable range 107 of the robot by the image processing device 103 searching for a part of the boundary of the movable range 107 of the robot and then searching for the boundary of the movable range 107 of the robot from the peripheral pixels thereof and the like are exemplified. Alternatively, a method of sampling pixels at a constant interval from an image and then performing searching for the boundary of the movable range 107 of the robot on the pixels may be used.

In the embodiment, the user can check the movable range 107 of the robot when the image processing area 108 is set through the processing for supporting the setting of the image processing area 108. Accordingly, the user can efficiently set the image processing area 108 while easily recognizing the movable range 107 of the robot. At this time, it is possible to avoid the image processing area 108 being set outside the movable range 107 of the robot by limiting the image processing area 108 to the inside of the movable range 107 of the robot. That is, according to the embodiment, it is possible to prevent a working instruction outside the movable range from being provided when the movement of the robot is corrected on the basis of a result of the image measurement and thereby to efficiently set the image processing area by visualizing the movable range 107 of the robot.

In the embodiment, the method of assuming all the pixels in the image as targets when whether or not the target pixels are in the movable range 107 of the robot is determined has been described as one of methods for acquiring the movable range 107 of the robot.

In addition, the method for sampling the pixels and the method for searching for the boundary of the movable range 107 of the robot have been described in the embodiment. By employing these methods, the data regarding the movable range 107 of the robot can be more efficiently acquired.

In addition, as a method for determining whether or not arbitrary coordinates in the robot coordinate system are inside the movable range 107 of the robot, there is a method of referring to a 3D model in addition to the method of using the moving check command of the robot 102. It is not necessary to execute the moving check command or the like for the respective coordinates in a case of a robot having a 3D model or a data for configuring the 3D model. Therefore, it is possible to efficiently acquire the data regarding the movable range 107 of the robot depending on response performance of the robot control device 101.

In addition, an item for setting whether or not to take the movable range of the robot into consideration may be provided in the setting screen illustrated in FIG. 4. In a case of setting that does not take the movable range of the robot into consideration, the movable range 107 of the robot is not displayed.

According to the embodiment, it is possible to support setting of an image processing area by presenting information regarding a movable range of a robot along with a captured image to a user. Therefore, the user can efficiently set an image processing area inside the movable range of the robot while checking the visualized movable range of the robot.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-220482 flied Nov. 26, 2018 which is hereby incorporated by reference herein in its entirety.

What is claimed is:

1. A control method for an image processing device, the method comprising:
acquiring a captured image of a work area including an object to be worked by a working device, which was taken by an imaging device;
displaying a setting screen on a display device to allow a user to set an image processing area, which is an area where a predetermined image processing is performed, in an area of the captured image of the work area; and
acquiring movable range information that indicates a movable range of a working device, operations of which are controlled on the basis of a result of the predetermined image processing,
wherein an area within the movable range of the working device and an area outside the movable range of the working device are displayed in an area for displaying the captured image of the work area on the setting screen.

2. A non-transitory storage medium on which a computer program for making a computer execute control method for an image processing device is stored, the method comprising:
acquiring a captured image of a work area including an object to be worked by a working device, which was taken by an imaging device;
displaying a setting screen on a display device to allow a user to set an image processing area, which is an area where a predetermined image processing is performed, an area of the captured image of the work area; and; and
acquiring movable range information that indicates a movable range of a working device, operations of which are controlled on the basis of a result of the predetermined image processing,
wherein an area within the movable range of the working device and an area outside the movable range of the working device are displayed in an area for displaying the captured image of the work area on the setting screen.

3. An image processing device comprising:
a memory storing instructions; and
at least one processor executing the instructions or circuit causing the image processing device to:
acquire a captured image of a work area including an object to be worked by a working device, which was taken by an imaging device;
display a setting screen on a display device to allow a user to set an image processing area, which is an area where predetermined image processing is performed, in an area of the captured image of the work area; and
acquire movable range information indicating a movable range of a working device, operations of which are controlled on the basis of a result of the predetermined image processing,
wherein the processor and/or circuit causes the device to display an area within the movable range of the working device and an area outside the movable range of the working device in an area for displaying the captured image of the work area on the setting screen.

4. The image processing device according to claim 3, wherein the processor and/or circuit causes the device to check whether or not the working device is able to move to a designated position, by using a moving command or a moving check command.

5. The image processing device according to claim 3, wherein the processor and/or circuit causes the device to acquire the movable range information with reference to a 3D model indicating a movable range corresponding to a model type of the working device.

6. The image processing device according to claim 3, wherein the processor and/or circuit causes the device to acquire movable range information of the working device in a designated posture in a case in which information regarding the posture of the working device is designated.

7. The image processing device according to claim 3, wherein the processor and/or circuit causes the device to acquire data of a three-dimensional captured image, and to determine whether or not the working device is able to move to a position in three-dimensional coordinates.

8. The image processing device according to claim 3, wherein the captured image is captured by an imaging device that is attached to the working device.

9. The image processing device according to claim 3, wherein the processor and/or circuit performs control such that the captured image and the movable range of the working device are displayed in a superimposed manner.

10. The image processing device according to claim 3, wherein the processor and/or circuit causes the device to perform control such that an item for setting a shape of the image processing area is displayed on the setting screen.

11. The image processing device according to claim 3, wherein the processor and/or circuit performs control such that an area that is able to be set as the image processing area is restricted to being in the movable range of the working device.

12. The image processing device according to claim 3, wherein the processor and/or circuit causes the device to perform control such that a notification is output in a case in which the area outside the movable range of the working device is set as the image processing area.

13. The image processing device according to claim 3, wherein the working device includes an arm and a tool unit that is attached to the arm.

14. The image processing device according to claim 13, wherein the captured image is captured by an imaging device that is attached to the arm or the tool.

15. The image processing device according to claim 13, wherein the processor and/or circuit causes the device to display an item for designating a posture of the tool in setting of the image processing area.

16. The image processing device according to claim 13, wherein the processor and/or circuit causes the device to display an item for selecting whether or not to take a posture of the tool into consideration in setting of the image processing area.

* * * * *